Figure 1:
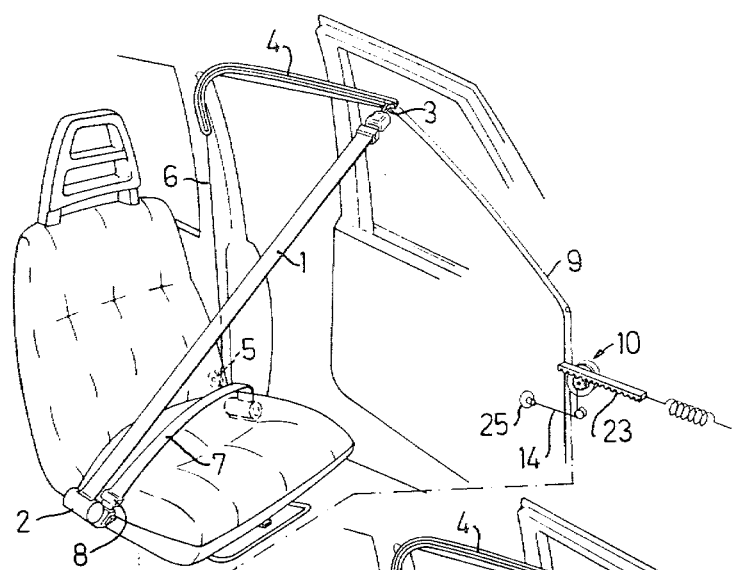

United States Patent
Pilhall

[11] 4,317,583
[45] Mar. 2, 1982

[54] PASSIVE SAFETY BELT SYSTEM FOR MOTOR VEHICLES

[75] Inventor: Stig T. L. Pilhall, Trollhättan, Sweden

[73] Assignee: AB Volvo, Goteborg, Sweden

[21] Appl. No.: 134,161

[22] Filed: Mar. 25, 1980

[30] Foreign Application Priority Data

Apr. 2, 1979 [SE] Sweden ............................ 7902899

[51] Int. Cl.³ .............................................. B60R 21/10
[52] U.S. Cl. ....................................................... 280/804
[58] Field of Search ................ 280/804, 807, 802, 803

[56] References Cited
U.S. PATENT DOCUMENTS

| | | | |
|---|---|---|---|
| 3,995,884 | 12/1976 | Bauer | 280/804 |
| 4,222,586 | 9/1980 | Takada | 280/804 |
| 4,225,154 | 9/1980 | Takada | 280/804 |
| 4,241,941 | 12/1980 | Yamamoto | 280/804 |

FOREIGN PATENT DOCUMENTS 2145022  3/1972  Fed. Rep. of Germany .
2445688  4/1976  Fed. Rep. of Germany .

*Primary Examiner*—Robert R. Song
*Attorney, Agent, or Firm*—Young & Thompson

[57] ABSTRACT

A passive safety belt system for motor vehicles. The upper point of a diagonal-type belt is displaced by a fitting, slidably mounted in a guide track extending above the door between vehicle posts that are forward and rearward of the driver's door and joined to a cord connected with a differential mechanism which has a manual drive and preferably comprises two unequally large sheaves. The cord is reeled up on one sheave when a drive device such as a pull wire is unreeled from the other sheave. The differential mechanism coacts with the door lock so as to release it just before the fitting reaches the forward end of the track.

10 Claims, 7 Drawing Figures

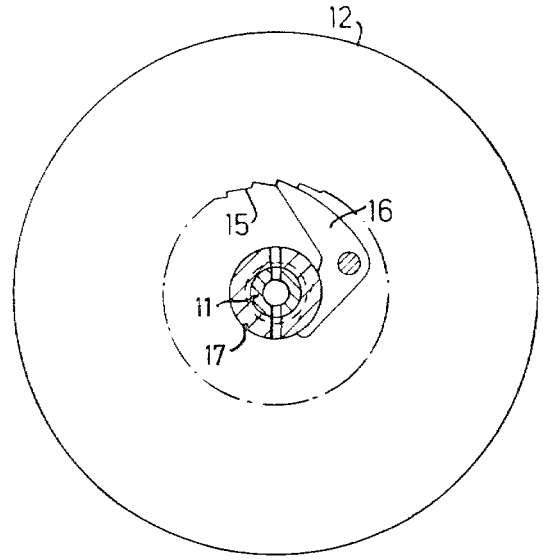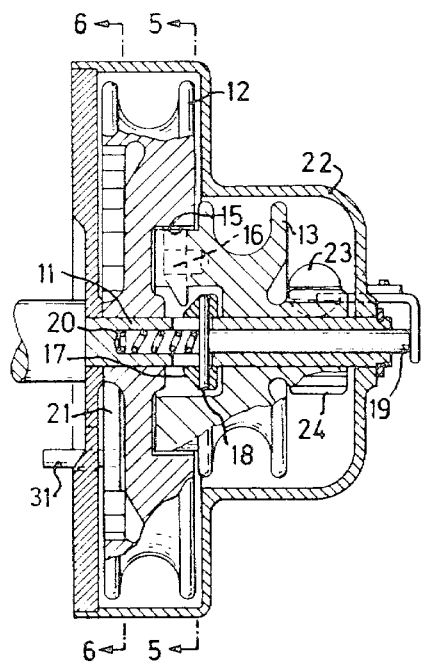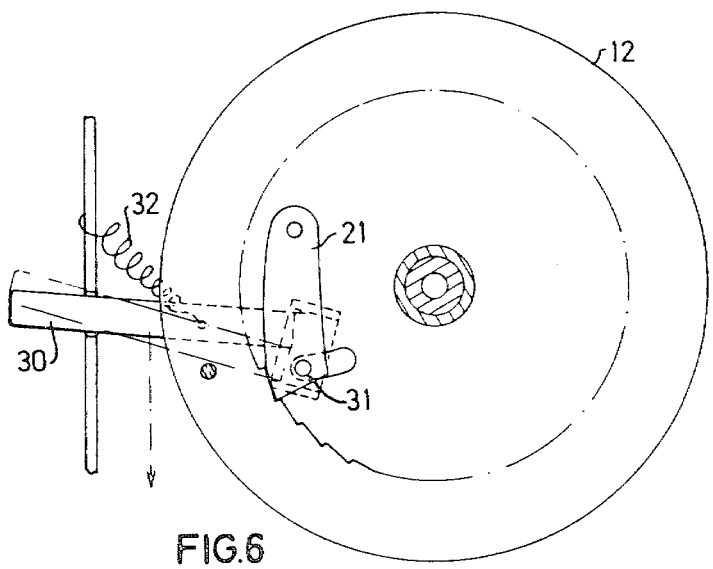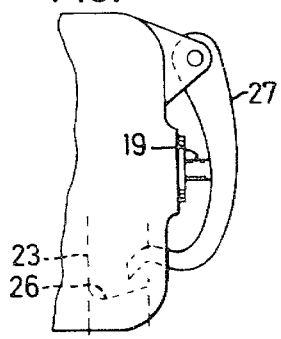

PASSIVE SAFETY BELT SYSTEM FOR MOTOR VEHICLES

The present invention relates to a passive safety belt system for motor vehicles, comprising a belt band which has an end connected to a reel mechanism and an effective portion extending diagonally across a vehicle seat from an upper point at the inside of the body to a lower point at or in the vicinity of the floor of the vehicle, the upper point of the diagonal band portion cooperating with a fitting which is displaceable in a guide running in the vehicle body above the door adjacent to the seat in order to displace, in connection with opening of the door, the upper point of the diagonal band portion from a rear position forward along the guide.

A passive belt system of the above type is previously known, by German Offenlegungsschrift No. 2 552 862 for example. In that system the fitting is driven back and forth by means of a reversible electric motor, which via a reduction gear drives an endless cord, joined to the fitting and running over pulleys. The system comprises a number of electrical components such as limit switches, relays and electromagnets to control the movement of the fitting and the fixing of it in a forward position when the vehicle door is opened, and for controlling of the movement of the fitting to a rear position and fixing it there when a person has sat down in the seat, closed the door and turned the ignition. Due to the large number of electrical components required, such a system will be complicated, expensive and unreliable.

Substantially more simple passive belt systems are also known, which completely lack a drive mechanism for the upper fitting. In a known system, the upper attachment fitting for the diagonal belt band is securely fixed to the upper rear corner of the door. Such a system is, to be sure, quite simple and reliable, but it has substantial disadvantages. The belt slides over the passenger's body and over the seat when the door is opened and closed. Furthermore, the belt is in the way and makes entry and exit more difficult, especially when the door is only partially opened.

The purpose of the present invention is to achieve a passive belt system which eliminates the disadvantages of both of the above-mentioned known systems.

This is achieved according to the invention by the fact that the band fitting slidably mounted in the guide is joined to a wire or cord which is connected to a differential mechanism with a manual drive means, said mechanism cooperating with the door lock mechanism and being arranged upon manual operation of the drive means to apply a pulling force to the cord or wire to displace, with the aid of the fitting, the upper point of the diagonal band portion forwards and after moving a predetermined distance, release the lock mechanism.

Figure 2:
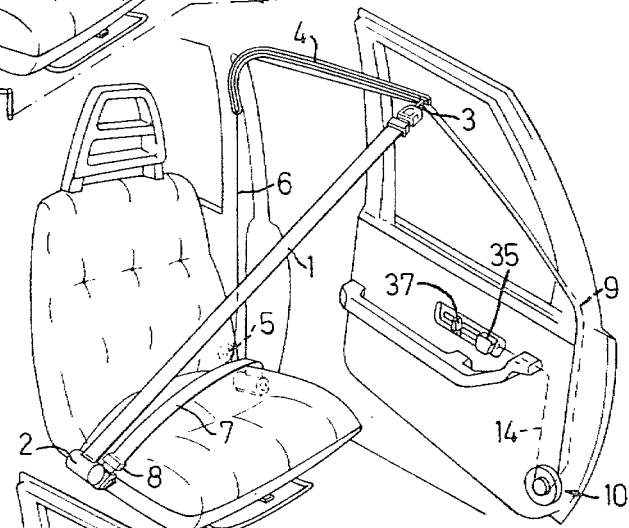
Figure 3:
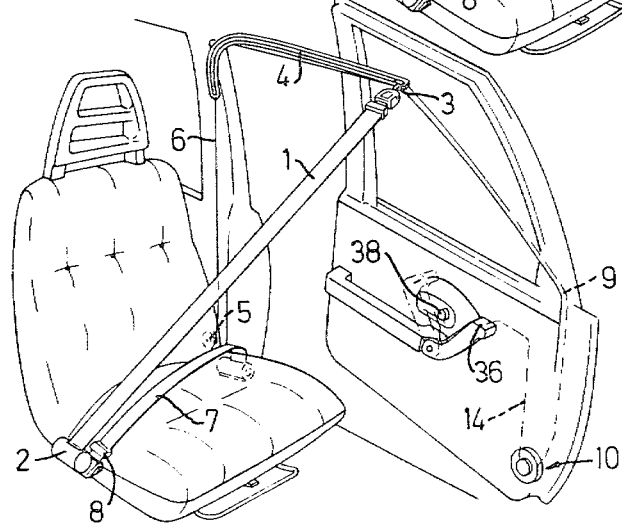

The invention is described in more detail with reference to the examples shown in the accompanying drawings, of which FIGS. 1–3 show schematically three different embodiments of a passive belt system according to the invention, FIG. 4 shows a cross section through an embodiment of an operating device for the belt fitting, FIG. 5 a view along the line 5—5 in FIG. 4, FIG. 6 a view along the line 6—6 in FIG. 4, and FIG. 7 an end view of a portion of the device in FIG. 4.

The passive belt system shown in FIGS. 1–3 comprises a diagonal belt band 1, the lower end of which is conventionally joined to a reel mechanism 2. The upper end of the band is joined to an attachment fitting 3 in the form of a slide member which is slidably mounted in a guide track 4. The track extends horizontally from the so-called "A" post of the vehicle, forward of the driver's door, to its "B" post, rearward of the driver's door, where it curves downwards a certain distance. A spring-loaded reel 5 is arranged in the "B" post, and one end of a filament comprising a wire or cord 6 is attached thereto. The other end is attached to the slide member 3, which is thus spring-biased to the left in FIGS. 1–3. A second wire or cord 9 is attached to the slide member 3 and stretches to an operating device 10, which in FIG. 1 is placed in the "A" post and in FIGS. 2 and 3 in the door. FIGS. 1–3 also show a conventional hip belt 7 with a manual locking mechanism 8.

The operating device 10, which is shown in detail in FIGS. 4–7, has two sheaves 12 and 13 rotatably journalled on a common shaft 11. The end of cord 9 is intended to be fixed to the larger sheave, so that the cord is rolled up on the sheave when it rotates. The end of the pull cord 14, shown with a solid line in FIG. 1 and with a dashed line in FIGS. 2 and 3, is intended to be fixed to the smaller sheave 13. Between the sheaves 12 and 13, there is a ratchet formed by internal teeth 15 on the sheave 12 and a catch 16 pivotally journalled on the sheave 13. Said catch 16 can be moved out of engagement with the teeth 15 by moving a conical member 17 to the left as viewed in FIG. 4. The member 17 is joined by means of a pin 18 to a rod 19 displaceably journalled in an axial bore in the shaft 11. The conical member is biased out of engagement with the catch 16 by a spring 20. Another catch 21 is pivotally journalled in a stationary housing 22, which encloses the sheaves 12 and 13. The catch 21 is arranged to engage a tooth in the sheave 12 to block the sheave and fix the fitting 3 of the belt in the forward position as will be described below.

The functioning of the belt system will now be described with reference to the embodiment shown in FIG. 1, in which the operating device 10 is placed in the "A" post of the vehicle. In this embodiment, the operating device 10 is provided with a rack 23, which engages a pinion 24 rigidly joined to sheave 13. The rack 23 is spring-loaded towards a position retracted into the "A" post, but when the pinion 24 rotates it is displaced rearwards out through an opening in the post and into a corresponding opening in the forward edge of the door to release the locking mechanism (not shown) of the door.

When a person sits in the seat and the door is closed, the fitting 3 of the belt is pulled back into the rear, downwardly bent end of the guide track 4 by the reel mechanism 5, the rack 23 is retracted into the "A" post, and the pull cord 14 is reeled up on the sheave 13. For getting out of the vehicle, the person sitting in the seat pulls a handle 25 connected to the pull cord 14. This causes the sheave 13 to rotate and turns with it, via the catch 16, sheave 12, and the cord 9 is reeled onto the sheave 12 so that the fitting 3 is displaced forward in the guide track 4. The difference in sizes of the sheaves is chosen so as to produce an appropriate relationship between torque and distance. As the sheaves begin to rotate, the rack 23 is moved backwards into the opening in the door. The movement of the rack is adjusted so that the door lock mechanism is released just before the belt fitting 3 reaches its forward end position in the track 4. The door is now opened somewhat, e.g. about 1 dm, before its door stop begins to offer resistance. After the pull cord has been pulled out completely, the handle 25 is released and the cord is rolled up on the sheave 13 by it being driven in the opposite direction by the spring-loaded rack 23, as the rack is pulled into the post by its spring. During the return movement, sheave 12 is blocked by catch 21 so that the belt is fixed in its forward position. Just before the rack 23 reaches its forward end position, an abutment 26 on the rack 23 contacts a lever 27 which, when it is swung by the rack 23, pushes the rod 19 into the shaft, whereby the conical member 17 moves the catch out of engagement with the teeth 15 in the sheave 12. When the door is closed after the person has got out of the vehicle, the belt remains in the forward position.

In order to have the belt fitting return to its rear end position, all that is required now is that the catch 21 be moved out of engagement with the teeth in the sheave 12, and this can be accomplished in various ways. In an entirely mechanical embodiment of the belt system according to the invention, it is possible, as indicated schematically in FIG. 6, to arrange a pivoting rod 30 in the "A" post. One end of the rod 30 is located in the door opening, while its other end extends to the catch 21 to cooperate, when in a swung-down position, with a pin 31 on the catch 21. The rod 30 can be connected to the seat via a linkage and cord system, indicated schematically in FIG. 1, in such a manner that the rod is swung down to a position directly in front of the catch pin 31 when the seat is loaded, so that the rod 30 via the pin 31 moves the catch out of engagement with the teeth of the sheave 12 when the door is closed. The sheave 12 is thereby released and the belt fitting 3 moves back to its rear position in the guide track under the influence of the spring-loaded reel 5. When the seat is empty, a spring 32 holds the rod 30 in a swung-up position, whereby the rod slides to one side of the pin 31 and leaves the catch unaffected when the door is closed. As an alternative to a linkage and cord system, the rod 30 can be maneuvered by means of an electromagnet and an electric switch in the seat. Instead of allowing the release of the sheave to be contingent upon the seat load, it can be contingent upon the ignition being turned on.

In the embodiment described, the door can be opened with the usual handle without the belt being moved forward. This is an advantage in backing maneuvers, for example.

FIGS. 2 and 3 show two embodiments of the system according to the invention, in which the operating device 10 is placed in the door. In both cases the pull cord 14 is connected to a handle 35 and 36, respectively, which, after being moved a certain distance, makes contact with the door handle 37 and 38, respectively, and carries it with it. The result is the same as in the case described above, i.e. the lock mechanism of the door is released just before the belt has reached its forward end position. The door-mounted maneuver device 10 lacks counterparts to the pinion 24 and rack 23 with return spring. The return rotation of the sheave 13 can instead be effected with the aid of the spring (not shown) built into the device 10, said spring being tensioned when the pull cord 14 is pulled out. When the operating device 10 is placed in the door, it is suitable to release the catches 16 and 21 electromagnetically. A simple and practical solution is to use the switch usually placed in the door opening for the interior lighting, to release sheave 13 from sheave 12. As previously, the catch for sheave 12 can be released with the aid of a switch which senses the seat load, or with the aid of the ignition lock.

In the preceding, the invention has been described with reference to an embodiment in which the upper end of the belt is fixed to the fitting 3. The invention is not, however, limited to such an arrangement but can also be applied to a conventional belt arrangement (not shown), in which the lower end of the belt band is fixed to a stationary fitting between the seats, while the roll mechanism is placed at the "B" post on or near the floor. The displaceable fitting 3 is in this case made with a guide in the form of a loop, for example, through which the belt runs. When the fitting 3 slides forward in the track 4, the upper point of the diagonal belt will be moved forward as previously, the difference being only that a portion of the belt will extend along the track. In this embodiment it is necessary to lead the belt over a hook or the like at the rear end of the horizontal portion of the track 4, so that it does not cross the door opening.

What I claim is:

1. In a passive safety belt system for motor vehicles having door lock mechanism, comprising a belt band which has an end connected to a reel mechanism and an effective portion extending diagonally across a vehicle seat from an upper point at the inside of a vehicle body side panel to a lower point adjacent the floor of the vehicle, the upper point of the diagonal band portion cooperating with a fitting which is displaceable in a guide running in said side panel above a door adjacent to the seat, in order to displace, in connection with opening of the door, the upper point of the diagonal band portion from a rear position, forwardly along the guide; the improvement in which the band fitting is joined to a filament which is connected to a pulling means of a differential mechanism having manual drive means which upon manual operation operates the pulling means to apply a pulling force to the filament to displace, with the aid of said fitting, the upper point of the diagonal band portion forwardly, said differential mechanism having means cooperating with a said door lock mechanism to release the lock mechanism after displacement of the fitting a predetermined distance.

2. Belt system according to claim 1, characterized in that the manual drive means has a hand grip, and in that the differential mechanism is arranged so that a certain movement of the hand grip results in a greater movement of the fitting.

3. Belt system according to claim 2, characterized in that the differential mechanism comprises two sheaves of different diameters, rotatable around a common axis of rotation and joined to each other via a releasable catch, in that the filament joined to the fitting can be reeled up on the larger sheave to displace the fitting forwards in the guide, and in that the drive means is made up of a pull filament which is connected to the smaller sheave and is arranged as the cord is unwound therefrom to drive the larger sheave in the reel-up direction.

4. Belt system according to claim 1, characterized in that the differential mechanism is provided with a catch device for fixing the fitting in its forward position, means being arranged to release the catch device in connection with entry into the vehicle, but to maintain the catch function when getting out of the vehicle.

5. Belt system according to claim 4, characterized in that said releasing means for the catch device are coordinated with the seat so as to release the catch device when the seat is loaded.

6. Belt system according to claim 4, characterized in that said releasing means for the catch device cooperates with the vehicle ignition lock to release the catch when the ignition is turned on.

7. Belt system according to claim 3, characterized in that the smaller sheave is spring-loaded in the direction for reeling up the pull filament onto the sheave, and in that means are arranged to release the catch between the sheaves in connection with getting out of the vehicle.

8. Belt system according to claim 3, characterized in that the differential mechanism is placed in the body in front of the door opening, and in that the smaller sheave is rigidly joined to a pinion which engages a rack which is disposed, upon rotation of the pinion, to be displaced towards the door opening and into a hole in the forward edge of the door and, after a certain rotary movement of the sheave, to act on the door lock mechanism, said rack being loaded by a return spring, by means of which the smaller sheave is loaded in the reel-up direction of the pull filament, and that an abutment is disposed on the rack to actuate, during the return movement of the rack, means for releasing the catch between the sheaves.

9. Belt system according to claim 1, characterized in that the differential mechanism is placed in the door, and in that the drive means is provided with a hand grip which is arranged so that after a certain movement it makes contact with the handle for the door lock mechanism to drive the handle with it in its continued movement.

10. Belt system according to claim 1, characterized in that the guide for the fitting extends above the door from the forward door post to the rear door post, where it is curved downwards and extends a certain distance down along the rear post.

* * * * *